Figure 1:
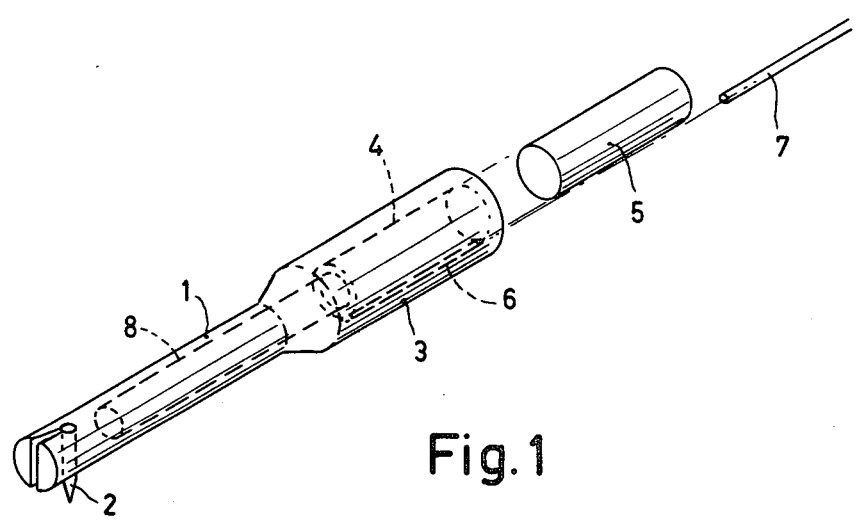

United States Patent [19]

Smit et al.

[11] 4,068,850
[45] Jan. 17, 1978

[54] STYLUS UNIT FOR PICK-UPS AND/OR CUTTERS

[75] Inventors: Elzo Smit; Keimpe van Wijk, both of Eindhoven, Netherlands

[73] Assignee: U.S. Philips Corporation, New York, N.Y.

[21] Appl. No.: 707,036

[22] Filed: July 20, 1976

Related U.S. Application Data

[63] Continuation of Ser. No. 560,162, March 20, 1975, abandoned.

[30] Foreign Application Priority Data

Apr. 1, 1974 Netherlands .......................... 7404360

[51] Int. Cl.² .............................................. G11B 3/46
[52] U.S. Cl. ...................................................... 274/37
[58] Field of Search ..................... 274/37, 38; 179/100.41 R, 100.41 K; 33/18 R, 27 C

[56] References Cited

U.S. PATENT DOCUMENTS

| | | | |
|---|---|---|---|
| 2,326,460 | 8/1943 | Hasbrouck | 274/38 X |
| 2,451,221 | 12/1948 | Hutter | 274/37 X |
| 2,473,374 | 6/1949 | Hutter | 274/38 |
| 3,146,319 | 8/1964 | Stanton | 274/37 X |
| 3,526,964 | 9/1970 | Clark | 33/27 C |
| 3,918,723 | 11/1975 | Nakajima et al. | 274/37 |

*Primary Examiner*—Charles E. Phillips
*Attorney, Agent, or Firm*—Frank R. Trifari; David R. Treacy

[57] ABSTRACT

A stylus unit having a stylus holder with a stylus at one end, a magnetic element captured in the holder, and a locating wire, the stylus holder and the locating wire formed of a reinforced plastic.

8 Claims, 2 Drawing Figures

STYLUS UNIT FOR PICK-UPS AND/OR CUTTERS

This is a continuation, of application Ser. No. 560,162, filed Mar. 20, 1975, now abandoned.

The invention relates to a stylus unit for grooved recording pick-ups or cutters, having a stylus holder, provided at one end with a stylus and at its other end with a magnetic element.

Such stylus units are inter alia known from U.S. Pat. No. 3,463,889 and as described therein may consist of a hard-magnetic element to which a stylus holder is secured, such a holder generally consisting of a tube of, for example, aluminum so as to minimize the mass.

Fixation of the stylus holder to the magnetic element is difficult. Frequently a slot is made in the magnet for this purpose, which may render the system asymmetrical, or it is attempted to make a hole in the magnetic element at the location of the longitudinal axis, which is also difficult and expensive.

It is an object of the invention to mitigate said drawbacks. According to the invention the stylus holder consists of a reinforced plastic in which the magnetic element is accommodated.

In a embodiment of a stylus unit according to the invention the stylus holder is provided with a cavity in which the magnetic element and/or a locating wire can be fixed at a later stage. Said last mentioned procedure may for example be effected by means of cement or by connecting the stylus holder and the magnetic element to each other by means of an interference fit.

In this embodiment of the invention the stylus holder can be made hollow, so as to reduce the mass.

In a different embodiment of a stylus unit according to the invention the magnetic element and/or one end of a locating wire, if provided, is embedded in the stylus holder. The advantage of this is that the stylus holder and the other components are formed and secured in the same operation.

In a further embodiment of a stylus unit according to the invention the locating wire also consists of a reinforced plastic. This has the advantage that the separate locating wire may be dispensed with.

In still another embodiment of a stylus unit according to the invention the end of the stylus holder at the stylus side is provided with a slot whose plane of symmetry extends through the centre line of the stylus, which slot extends up to the hole for the stylus.

The stylus can then readily be mounted by pressing in, allowing substantial thickness tolerances of the stylus and avoiding splitting of the stylus holder.

In yet another embodiment of a stylus unit according to the invention the plastic material is reinforced with carbon filaments. This has the advantage that the assembly can be very light, because the specific gravity of said substance is approximately 1.6 compared with 2.7 for aluminum, so that the mass can be reduced, while the modulus of elasticity is substantially equal to that of steel, so that the stylus holder either can be made more rigid or its weight can be further reduced.

Instead of carbon filaments it is alternatively possible to employ boron fibers, the specific gravity then being equal to that of aluminum but the advantage of the greater rigidity or a reduced weight at equal rigidity being retained. According to the invention the reinforcement can also be made of silicon single-crystals (whiskers).

Figure 2:
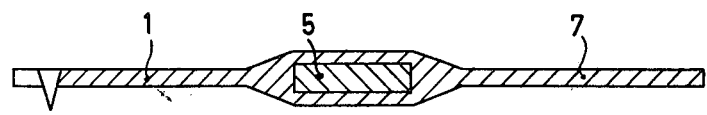

The invention will now be described in more detail with reference to the drawing in which FIG. 1 represents a stylus unit in which the magnetic element can be fitted afterwards, FIG. 2 represents a stylus unit which is formed simultaneously with the locating wire.

In FIG. 1 a stylus holder 1 is at one side provided with a stylus 2 and at the other side with a thickened portion 3, which is provided with a cavity 4 which can accommodate the magnetic element 5. Tangent to the cavity 4 a cavity 6 of smaller diameter is provided, in which a locating wire 7 is fixed.

Both the magnetic element 5 and the locating wire 7 may be cemented in position or may be fixed by means of an interference fit. It is alternatively possible to embed the magnetic element and/or the locating wire in the cavity 4.

Although in the present instance the magnetic element 5 is cylindrical, it will be evident that said element may have any other cross-section, such as for example square or cross-shaped.

To reduce the mass the stylus holder may be provided with a cavity 8.

In FIG. 2 the magnetic element 5 is embedded in an elongated stylus holder 1 of a reinforced plastic and the locating wire 7, which is integral with the stylus holder 1, also consists of a reinforced plastic. The holder 1 and integral wire 7 thus form portions of a unitary mass.

It is obvious that the center line of the stylus holder need not coincide with the center line of the magnetic element and/or locating wire, but may be offset relative to one another or make an angle with one another.

The magnetic element may be soft or hard-magnetic.

The orientation of the reinforcement may be that of the center line of the stylus holder, but it is alternatively possible to provide the reinforcement in different layers of different orientations.

What is claimed is:

1. A stylus unit of the type used for grooved recordings, comprising a stylus, a stylus holder and a magnet, wherein the stylus holder comprises an elongated unitary mass of reinforced plastic material having a center portion, a first end portion, and a second end portion; said first end portion having a hole for holding the stylus, said stylus being fitted directly in said hole, said center portion having a cavity, said magnet being embedded in said cavity, said second end portion of said mass forming a locating wire.

2. A stylus unit as claimed in claim 1, wherein said stylus has a center line, and said means for holding said stylus comprises a hole and a slot extending toward the center line from the end of the holder to said hole.

3. A stylus unit as claimed in claim 2, wherein said magnet is embedded in said cavity so as to be completely surrounded by said reinforced plastic material.

4. A stylus unit as claimed in claim 3, wherein said reinforced plastic material comprises carbon filaments.

5. A stylus unit as claimed in claim 3, wherein said reinforced plastic material comprises boron fibers.

6. A stylus unit as claimed in claim 3, wherein said reinforced plastic material comprises silicon whiskers.

7. A stylus unit of the type used for grooved recordings, comprising a stylus, a stylus holder and a magnet, wherein the stylus holder consists of an elongated solid unitary mass of reinforced plastic material having a first end having a hole for holding the stylus and having a center portion having a single cavity only remote from said first end, said magnet being held in said cavity and a locating wire formed by a portion of said unitary mass extending from said cavity opposite said first end to a second end, wherein said stylus has a center line, and said hole for holding said stylus comprises a slot extending toward the center line from the end of the holder to said hole.

8. A stylus unit as claimed in claim 7, wherein said magnet is embedded in said cavity so as to be completely surrounded by said unitary mass.